United States Patent
Lai (10) Patent No.: US 10,642,132 B1
(45) Date of Patent: May 5, 2020

(54) TURNTABLE AND LIGHT BOX FOR RING PHOTOGRAPHY

(71) Applicant: Ortery Technologies, Inc., Irvine, CA (US)

(72) Inventor: Peng-Cheng Lai, Los Altos, CA (US)

(73) Assignee: Ortery Technologies, Inc., Irvine, CA (US)

( * ) Notice: Subject to any disclaimer, the term of this patent is extended or adjusted under 35 U.S.C. 154(b) by 0 days.

(21) Appl. No.: 16/372,586

(22) Filed: Apr. 2, 2019

(51) Int. Cl.
*G03B 17/56* (2006.01)
*G03B 15/02* (2006.01)

(52) U.S. Cl.
CPC ........... *G03B 17/561* (2013.01); *G03B 15/02* (2013.01)

(58) Field of Classification Search
CPC .................................................... G03B 17/561
USPC ............................................................ 396/4
See application file for complete search history.

(56) References Cited

U.S. PATENT DOCUMENTS

| 6,190,609 B1* | 2/2001 | Chapman | A61L 2/0011 422/24 |
| 9,810,972 B2* | 11/2017 | Callomon | F16M 11/00 |
| 2014/0238959 A1* | 8/2014 | Tai | B23K 37/04 219/121.6 |
| 2016/0128941 A1* | 5/2016 | Park | A61K 9/1682 264/8 |
| 2016/0282258 A1* | 9/2016 | Callomon | F16M 11/00 |

* cited by examiner

*Primary Examiner* — Clayton E. LaBalle
*Assistant Examiner* — Dennis Hancock (57) ABSTRACT

A turntable for ring photography is provided and includes a vacuum pump, a motor with a hollow shaft, an air hose connected between the vacuum pump and the hollow shaft, and a platter with a suction hole airtight communication with the hollow shaft. The suction hole provides a vacuum suction for ring standing when the vacuum pump is turned on. The platter brings the ring to rotate when the motor is turned on. A light box for ring photography is also provided and includes the foregoing turntable and a box. The box includes a base and the base has a top surface and an opening formed on the top surface. The vacuum pump is disposed under the top surface or outside the box. The motor is disposed under the top surface. The platter is embedded in the opening.

17 Claims, 6 Drawing Sheets

TURNTABLE AND LIGHT BOX FOR RING PHOTOGRAPHY

FIELD OF THE INVENTION

The present invention relates to a turntable used for ring photography and a light box including the foregoing turntable, and more particularly to a turntable capable of providing vacuum suction for ring standing photography and a light box including the foregoing turntable.

DESCRIPTION OF THE RELATED ART

In traditional, the ring photography usually used a ring holder, wax or clear adhesive dots to hold a ring to stably stand on a table or a platter for 2D, 360 degrees or 3D photography.

However, the ring holder is unavoidably not only being captured in the image but also partially blocking the ring. In contrast, even the wax or the clear adhesive dots is significantly smaller than the ring holder, it is also difficult to completely hide it under the ring for avoiding it being captured. In addition, there is always some used wax or clear adhesive dots remaining on the ring, so that users need to take more time to clean the ring and possibly scratch the ring during cleaning. Without the assistance of them, the ring can only be lied down on the table or the platter for photography. Accordingly, it is desired to provide better approaches to assist the ring in standing in front of a clearer and pure color background for 2D, 360 degrees or 3D photography.

SUMMARY OF THE INVENTION

The present invention is directed to a turntable, wherein the vacuum suction provided by its vacuum pump can assist a ring in stably standing on its platter, and its motor can bring the ring to rotate along with the platter.

The present invention is also directed to a light box, wherein its turntable can not only assist a ring in stably standing up via the vacuum suction but also rotate the ring along with the platter, and its box can provide a clear and pure color background to assist the ring with 2D, 360 degrees or 3D photography.

The present invention provides a turntable suitable for ring photography, wherein the turntable comprises a vacuum pump, a motor, an air hose and a platter. The motor has a hollow shaft, the air hose connects the vacuum pump and the hollow shaft, and the platter has a suction hole airtight communication with the hollow shaft. The suction hole provides a vacuum suction to enable the ring to stand on a carrying surface of the platter when the vacuum pump is turned on, and the platter brings the ring to rotate when the motor is turned on.

According to an embodiment of the present invention, the turntable further comprises at least an air connector, and at least one of the hollow shaft and the vacuum pump connects with the air hose via the air connector.

According to an embodiment of the present invention, the platter further has at least a notch formed on the carrying surface and extending outward from the suction hole, and a depth of the notch smaller or equal to a thickness of the platter. In a specific embodiment of the present invention, a number of the notch is plural, and the notches are symmetrically, radially or asymmetrically arranged around a center of the suction hole.

According to an embodiment of the present invention, the platter is made of metals, opaque plastics, translucent plastics, transparent plastics or a combination thereof.

According to an embodiment of the present invention, the platter includes a first platter and a second platter, and the suction hole includes a first suction hole passing through the first platter and a second suction hole passing through the second platter. In a specific embodiment of the present invention, the first platter can have an upper side and a tray formed on the upper side, and an inner contour of the tray can match up with an outer contour of the second platter, and a depth of the tray can be larger than a thickness of the second platter. In another specific embodiment of the present invention, the first platter can have an upper side and a tray formed on the upper side, the second platter has a lower side and a protrusion formed on the lower side, and an inner contour of the tray can match up with an outer contour of the protrusion, and a periphery of the second platter can be flush with or extending outward from a periphery of the first platter. Besides, in a specific embodiment of the present invention, the platter can further comprise a sealing unit, wherein the sealing unit can be an O-RING sealed between the first platter and the second platter, or can be an airtight tape sealing around the first platter and the second platter. Further, in a specific embodiment of the present invention, two opposite ends of at least one of the first suction hole and the second suction hole can have different at least one of sizes and shapes in cross-section.

According to an embodiment of the present invention, the suction hole is a round hole, an ellipse hole, an oval hole, an elongated hole, a square hole, a rectangle hole, a diamond hole, a polygon hole, a truncated cone hole, a truncated hemispherical hole or a combination thereof.

The present invention also provides a light box suitable for ring photography, wherein the light box comprises the foregoing turntable and a box. The box includes a base having a top surface and an opening formed on the top surface. The vacuum pump is disposed under the top surface or outside the box. The motor is disposed under the top surface, and the platter is embedded in the opening.

According to an embodiment of the present invention, the carrying surface is flush with or slightly higher than the top surface.

According to an embodiment of the present invention, the box further comprises at least one of a back light disposed to a rear side of the base, a front light disposed to a front side of the base, a side light disposed to a side of the base, a top light disposed over the base and a bottom light disposed under the top surface and the carrying surface. The top surface and the carrying surface are transparent or translucent.

According to an embodiment of the present invention, the top surface includes a first top surface adjacent to the back light and a second top surface away from the back light. The platter is located between the first top surface and the second top surface, and the carrying surface is slightly higher than the first top surface and slightly lower than the second top surface.

According to an embodiment of the present invention, the light box further comprises a tripod, wherein the tripod is disposed in front of the box for holding a camera.

Accordingly, the present invention provides various platters and combinations thereof, each of them is capable of holding a ring and having a center suction hole. Each of the platters can further be processed outward from the center suction hole and/or downward from the upper surface to form at least a notch symmetrically, radially or asymmetrically arranged around the center of the platter, so as to enable the ring to stand more stably. In addition, the platters can be made of metals, opaque plastics, translucent plastics, transparent plastics or a combination thereof. For example, the platter can be formed integrally and a carrying surface thereof can be a pure color flat surface for providing a pure color background. Alternatively, the platter can also be a multi-layer platter to facilitate manufacturing and processing, and different layers can be made of the same or different materials. For a multi-layer platter, the platter can be a border platter and its periphery is slightly higher than its carrying surface, so as to prevent the ring from falling out of the carrying surface. Alternatively, the top of the platter can be a flat surface, so as to provide a clean and pure color background. Moreover, the multi-layer platter can be a mounted platter and the layers can be combined by lapping and mounting to each other.

Besides, the light box provided in the present invention can not only stably hold a ring to stand on and rotate along with the platter, but also provide a clean and pure color background to the ring for 2D, 360 degrees and 3D photography by at least one of the front, side, top and bottom lights in its box. Furthermore, in this case, it is also possible to automatically cut out the image of the ring from the background in each shooting angle during 360 degrees and 3D photography by controlling the bottom and back lights with a transparent platter.

DETAILED DESCRIPTION OF THE INVENTION

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations are not described in detail in order not to obscure the present invention. Besides, in all of the following embodiments, the same or similar components illustrated in different embodiments refer to the same symbols.

Figure 1:
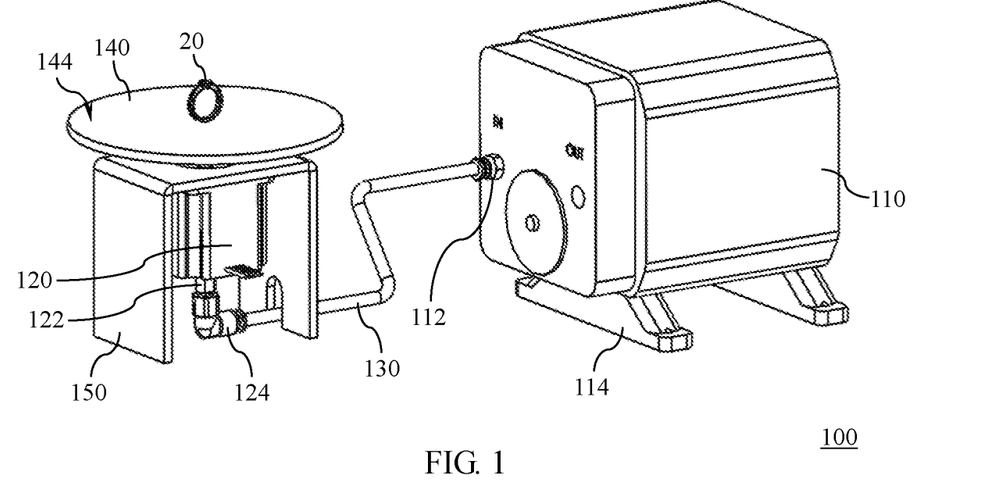
FIG. 1 illustrates a structural schematic view of a turntable usable for ring photography according to an embodiment of the present invention, wherein its platter is an integral platter with a flat carrying surface.
Figure 2:
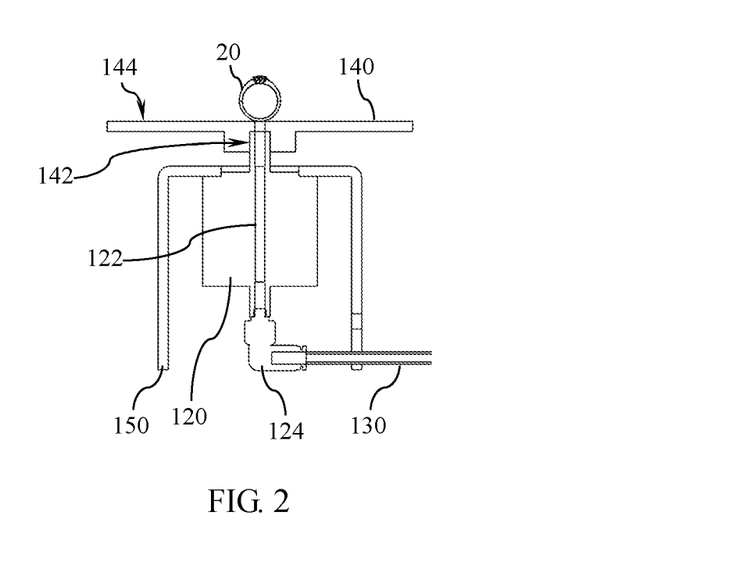
FIG. 2 illustrates a partial cross-sectional view of the turntable as shown in FIG. 1.

FIG. 1 illustrates a structural schematic view of a turntable usable for ring photography according to an embodiment of the present invention, while FIG. 2 illustrates a partial cross-sectional view of the turntable as shown in FIG. 1. Referring to FIG. 1 and FIG. 2 together, the present invention illustrates a turntable 100 suitable for ring photography, and the turntable 100 comprises a vacuum pump 110, a motor 120, an air hose 130 and a platter 140. The motor 120 has a hollow shaft 122, and the air hose 130 connects the vacuum pump 110 and the hollow shaft 122. In this embodiment, the turntable 100 can further comprises a fixing rack 150, wherein the vacuum pump 110 can be supported by two supporting legs 114 and disposed outside the fixing rack 150, while the motor 120 can be assembled in the fixing rack 150 and the top end of its hollow shaft 122 can pass through the top of the fixing rack 150. Besides, in the present embodiment, the turntable 100 can also comprise two air connectors 112 and 124, wherein the air connector 112 is fit onto an air inlet at a side of the vacuum pump 110, the air connector 124 is fit onto the bottom end of the hollow shaft 122, and the air hose 130 passes through a side of the fixing rack 150 with its two opposite ends respectively fitting onto the air connectors 112 and 124, so as to enable the hollow shaft 122 to airtightly communicate with the vacuum pump 110.

Further, the platter 140 has a suction hole 142 airtight communication with the hollow shaft 122. In the present embodiment, the suction hole 142 is, for example but not limited to, directly fitting onto the top end of the hollow shaft 122, so as to enable the suction hole 142 to airtightly communicate with the vacuum pump 110. In such a configuration, the suction hole 142 can provide a vacuum suction to assist a ring 20 in stably standing on a carrying surface 144 of the platter 140 when the vacuum pump 110 is turned on, while the platter 140 can bring the ring 20 to rotate when the motor is turned on. As a result, the turntable 100 can enable the ring 20 to stably stand on the carrying surface 144 and be rotated along with the platter 140 for 2D, 360 degrees and 3D photography. In a specific embodiment of the present invention, the platter 140 can be formed integrally and the carrying surface 144 can be a pure color flat surface, so as to provide a clear and pure color background for the ring 20 during 2D, 360 degrees or 3D photography.

Figure 3:
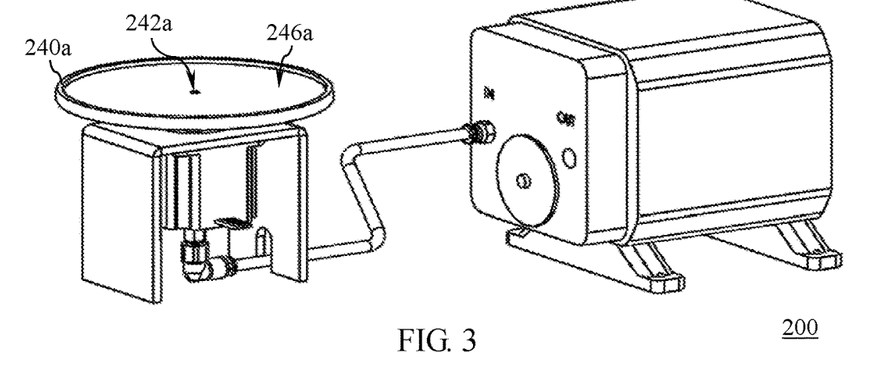
FIG. 3 to FIG. 5 illustrate some structural schematic views of a turntable usable for ring photography according to another embodiment of the present invention, wherein the platter is a multi-layer border platter.
Figure 4:
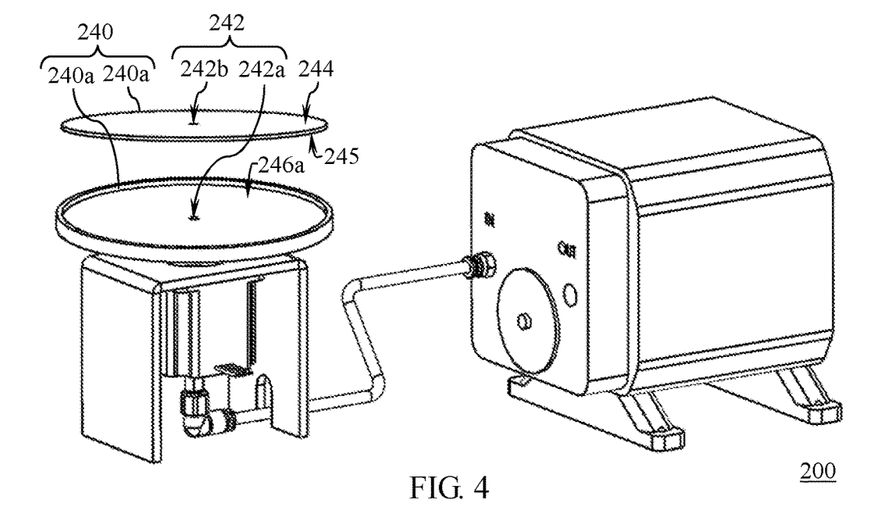
Figure 5:
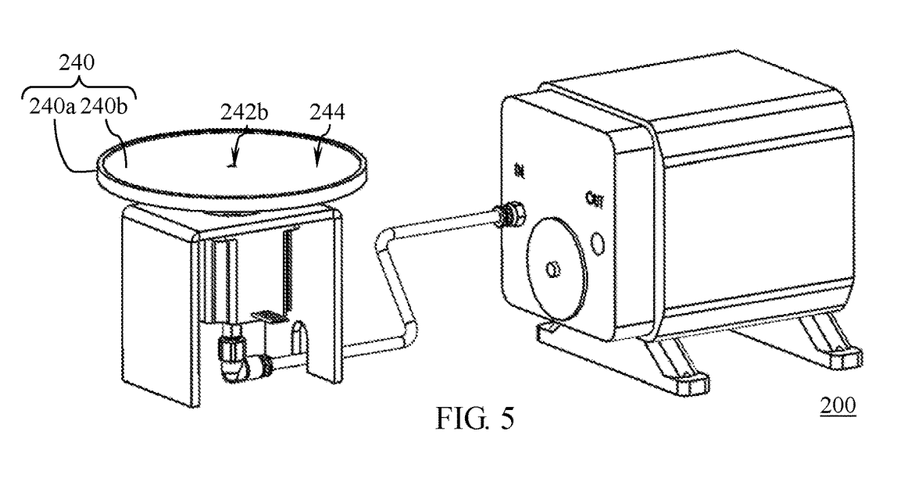

FIG. 3 to FIG. 5 illustrate some structural schematic views of a turntable usable for ring photography according to another embodiment of the present invention. Referring to FIG. 3 to FIG. 5, the turntable 200 in this embodiment is similar to the turntable 100 in the previous embodiment, except that the platter 240 is a multi-layer border platter, and thus the remaining components and the related descriptions thereof are omitted herein. In a word, the platter 240 can be composed of a first platter 240a and a second platter 240b, and the suction hole 242 can be composed of a first suction hole 242a passing through the first platter 240a and a second suction hole 242b passing through the second platter 240b. The carrying surface 244 of the platter 240 is the upper surface of the second platter 240*b*, while the first platter 240*a* can have a tray 246*a* formed on the upper side and an inner contour of the tray 246*a* can match up with an outer contour of the second platter 240*b*, so as to totally fit the second platter 240*b* into the tray 246*a* to keep airtightness between the first suction hole 242*a* and the second suction hole 242*b*. In the present embodiment, a depth of the tray 246*a* can be larger than a thickness of the second platter 240*b*, and thus the periphery of the first platter 240*a* will be slightly higher than its carrying surface 242, so as to form the platter 240 as a border platter to prevent the ring 20 illustrated in FIG. 1 and FIG. 2 from falling out of the carrying surface 244.

In a preferred embodiment of the present invention, the first platter 240*a* can be made of metals and the second platter 240*b* can be made of opaque plastics, so as to form the platter 240 as a multi-layer platter with multiple materials. The advantages of the multi-layer platter include, but not limited to, more selectivity of the materials and simpler manufacturing and processing procedures since different layers can be made of different materials with different manufacturing and processing procedures. In contrast, in other embodiments, the first platter 240*a* and the second platter 240*b* can also be made of either different materials other than the previous description or the same material. For example, each of the first platter 240*a* and the second platter 240*b* can be made of metals, opaque plastics, translucent plastics or transparent plastics.

In addition, the platter 240 can further comprises a sealing unit (non-illustrated) sealed between the first platter 240*a* and the second platter 240*b* to keep airtightness between the first suction hole 242*a* and the second suction hole 242*b*. For example, the sealing unit can be an O-RING sealed between the inner wall of the tray 246*a* and the periphery of the second platter 240*b*, or the bottom of the tray 246*a* and the bottom surface of the second platter 240*b*.

Figure 6:
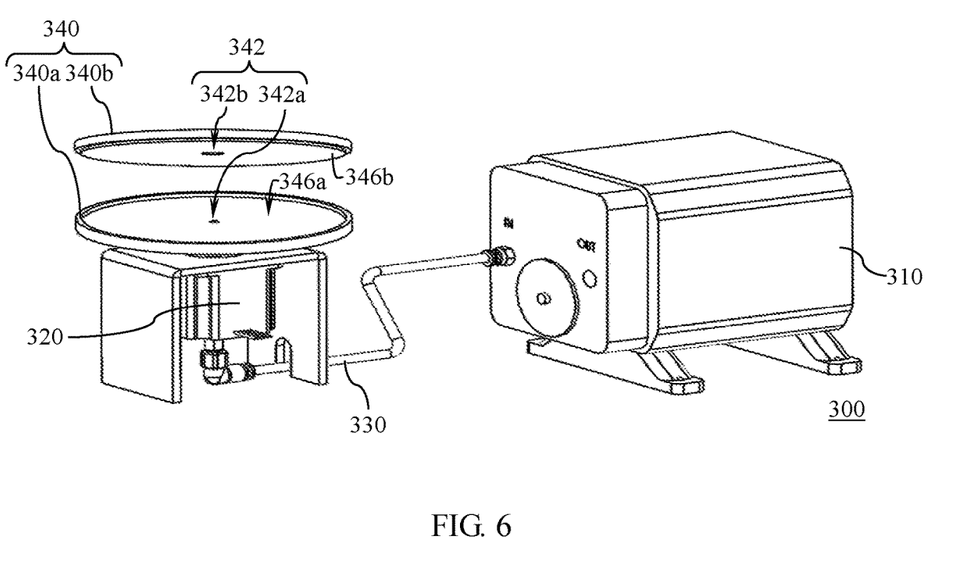
FIG. 6 and FIG. 7 illustrate two structural schematic views of a turntable usable for ring photography according to another embodiment of the present invention, wherein the platter is a multi-layer flat platter.
Figure 7:
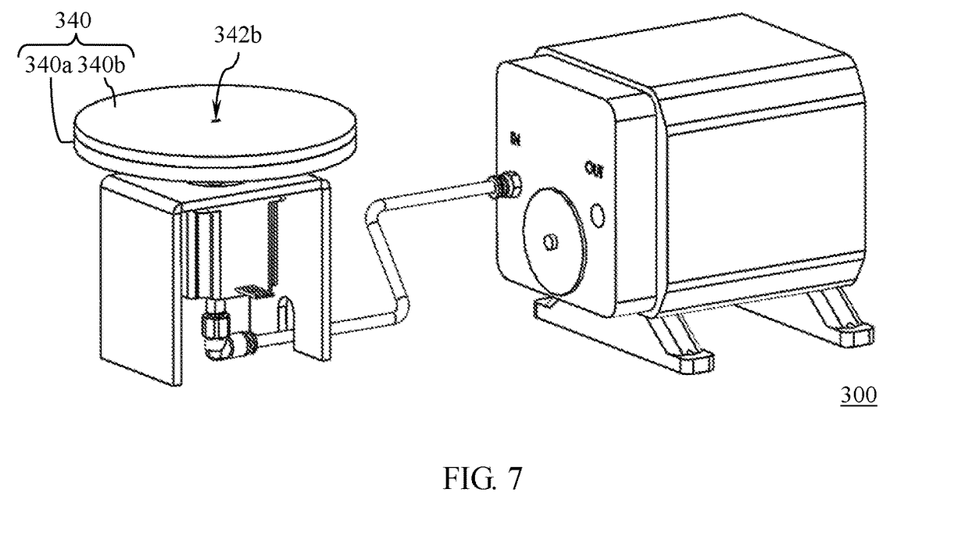

FIG. 6 and FIG. 7 illustrate two structural schematic views of a turntable usable for ring photography according to another embodiment of the present invention. Referring to FIG. 6 and FIG. 7, the turntable 300 in this embodiment is similar to the turntable 200 in the previous embodiment, except that the second platter 340*b*, and thus the remaining components and the related descriptions thereof are omitted herein. In a word, in the previous embodiment, both of the upper and lower surfaces of the second platter 340*b* are flat surfaces. In contrast, in the present embodiment, the second platter 340*b* can further has a protrusion 346*b* formed on the lower surface, and the inner contour of the tray 346*a* formed on the first platter 340*a* can match up with an outer contour of the protrusion 346*b*, so as to totally fit the protrusion 346*b* into the tray 346*a* to keep airtightness between the first suction hole 342*a* and the second suction hole 342*b*. Also, the periphery of the second platter 340*b* can be flush with or extending outward from a periphery of the first platter 340*a* to completely cover the upper side of the first platter 340*a*, and thus the platter 340 is formed as a flat platter similar to the embodiment as shown in FIG. 1.

Similarly, in the present embodiment, it is also possible to add a sealing unit described in the previous embodiment into the platter 340 to keep airtightness between the first suction hole 342*a* and the second suction hole 342*b*. Moreover, as shown in FIG. 7, the sealing unit can further be an airtight tape taping around the periphery of the platter 340 to completely cover the gap between the first and second platters 340*a*, 340*b* when the peripheries of the first and second platters 340*a*, 340*b* are completely or almost flush with each other. In contrast, in the other non-illustrated embodiments, the periphery of the second platter 340*b* can extend outward from the periphery of the first platter 340*a*, so as to form a larger flat platter.

Figure 8:
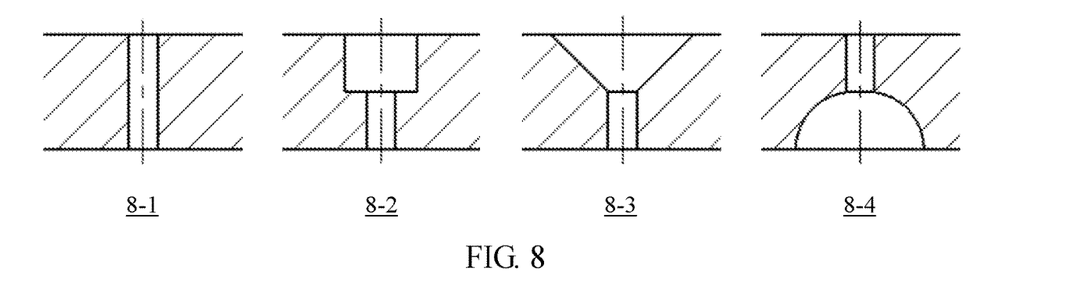
FIG. 8 illustrates some longitudinal section views of various suction holes according to an embodiment of the present invention.
Figure 9:
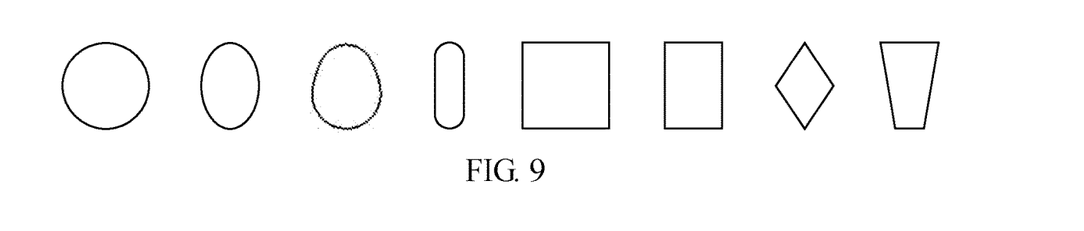
FIG. 9 illustrates some top views of various suction holes according to an embodiment of the present invention.

FIG. 8 illustrates some longitudinal section views of various suction holes according to an embodiment of the present invention. FIG. 9 illustrates some top views of various suction holes according to an embodiment of the present invention. In a word, the suction hole can be formed as various shapes to increase vacuum suction for various ring styles on the market. For example, the platter as shown in FIG. 8-1 can be an integral platter and its suction hole can be a straight hole, and the cross-section of the suction hole can be various shapes, such as round, ellipse, oval, elongated shape, square, rectangle, diamond, trapezoid or any other polygon. In contrast, referring to FIG. 8-2 to FIG. 8-4, the suction hole in other embodiments can also be a hole composed of at least two through holes with different cross-sectional sizes and/or shapes, i.e. two opposite ends of the suction hole can have different cross-sectional sizes and/or shapes.

In detail, the suction hole in the embodiment as shown in FIG. 8-2 is composed of two coaxial round holes with different diameters, which can be formed by drilling the platter twice with different sizes of drills. In contrast, the suction hole in the embodiment as shown in FIG. 8-3 is composed of a round hole and a truncated cone hole in coaxially arrangement, while the suction hole in some other embodiment as shown in FIG. 8-4 is composed of a round hole and a truncated hemispherical hole in coaxially arrangement. It should be noted that each of the suction holes as shown in FIG. 8-2 to FIG. 8-4 is formed on a single platter. However, in a non-illustrated embodiment, the platter can be composed of at least two layers and each layer can have a suction hole with a size and/or a shape different from that on another layer. For example, the suction hole as shown in FIG. 8-2 can be composed of a smaller and a larger round hole separately formed on different layers. Moreover, in some preferred embodiments, it is also possible to additionally process the platter to modify the shape of the suction hole on the carrying surface according to the ring style for increasing vacuum suction, for example but not limited to, forming at least an extra notch around the suction hole.

Figure 10:
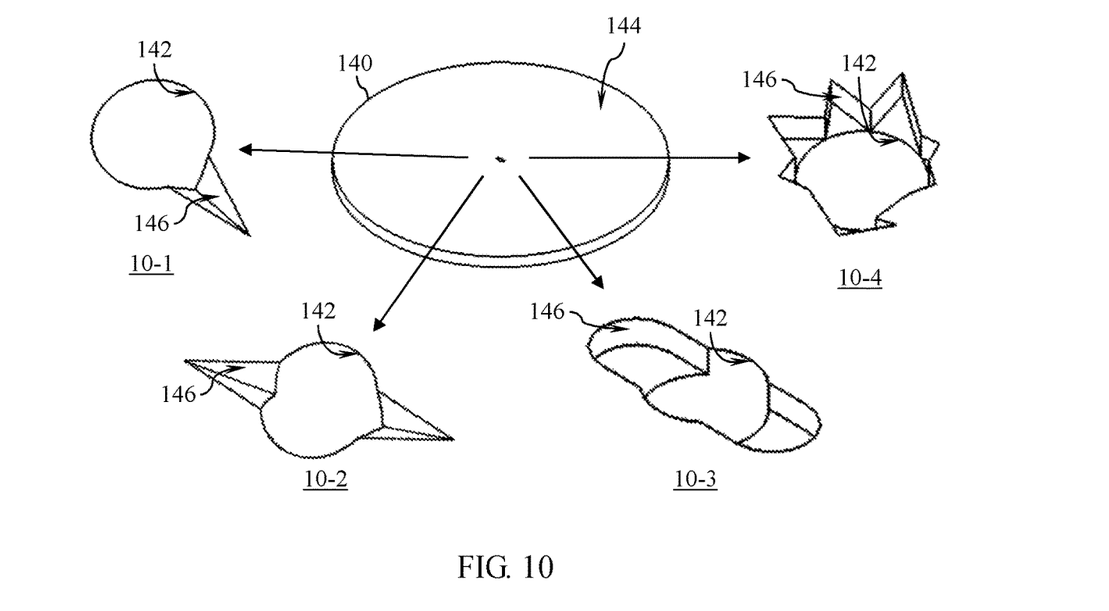
FIG. 10 illustrates some combinations of a suction hole and various notches according to an embodiment of the present invention.

FIG. 10 illustrates some combinations of a suction hole and various notches according to an embodiment of the present invention. In detail, in a preferred embodiment of the present invention as shown in FIG. 10-1, the suction hole 142 is a round hole, and the notch 146 is a single triangular cone notch extending outward from the suction hole 142 and downward from the carrying surface 144, and a depth of the notch 146 is smaller than a thickness of the platter 140. In contrast, in other non-illustrated embodiments, the depth of the notch can be equal to the thickness of the platter as well, i.e. the notch passing through the platter. Alternatively, in other non-illustrated embodiments, the platter can have a plurality of notches symmetrically, radially or asymmetrically arranged around a center of the suction hole.

For example, referring to FIG. 10-2, there are two triangular cone notches 146 arranged around the suction hole 142 symmetrically. In another example, referring to FIG. 10-3, there is an elongated notch formed from the carrying surface 114 and coaxial with the suction hole 142, and a width of the elongated notch is narrower than a diameter of the suction hole 142. In one more example, referring to FIG. 10-4, there are a plurality of notches 146 with different sizes and/or shapes asymmetrically formed around the suction hole 142. Those foregoing notches enable the vacuum suction provided by the suction hole to hold the ring on the carrying surface 114 much more stably.

Figure 11:
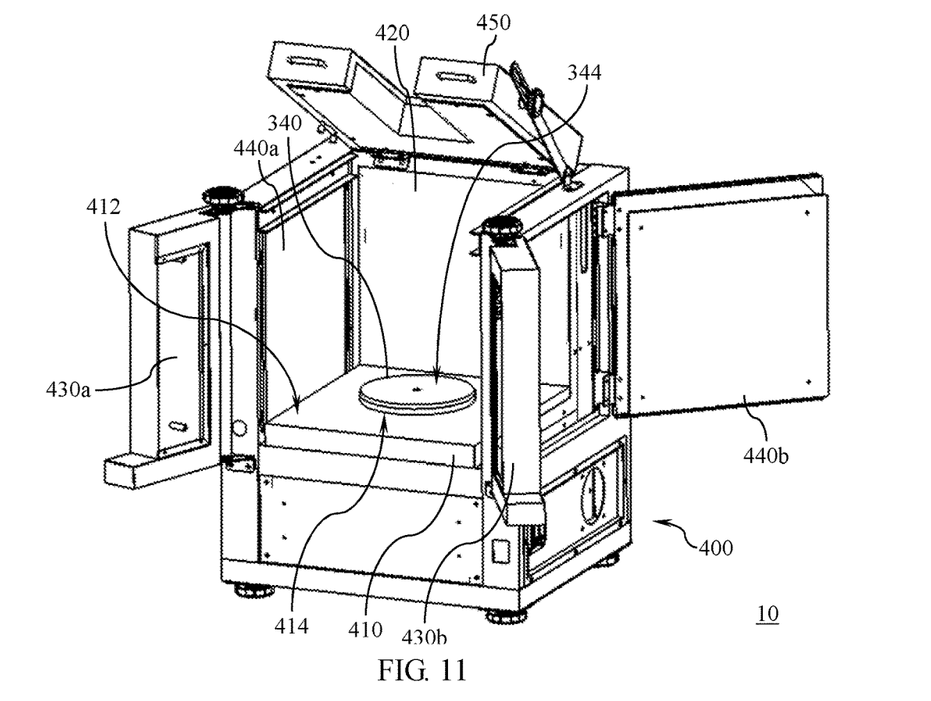
FIG. 11 to FIG. 13 respectively illustrates a structural schematic view of a light box usable for ring photography according to an embodiment of the present invention.
Figure 12:
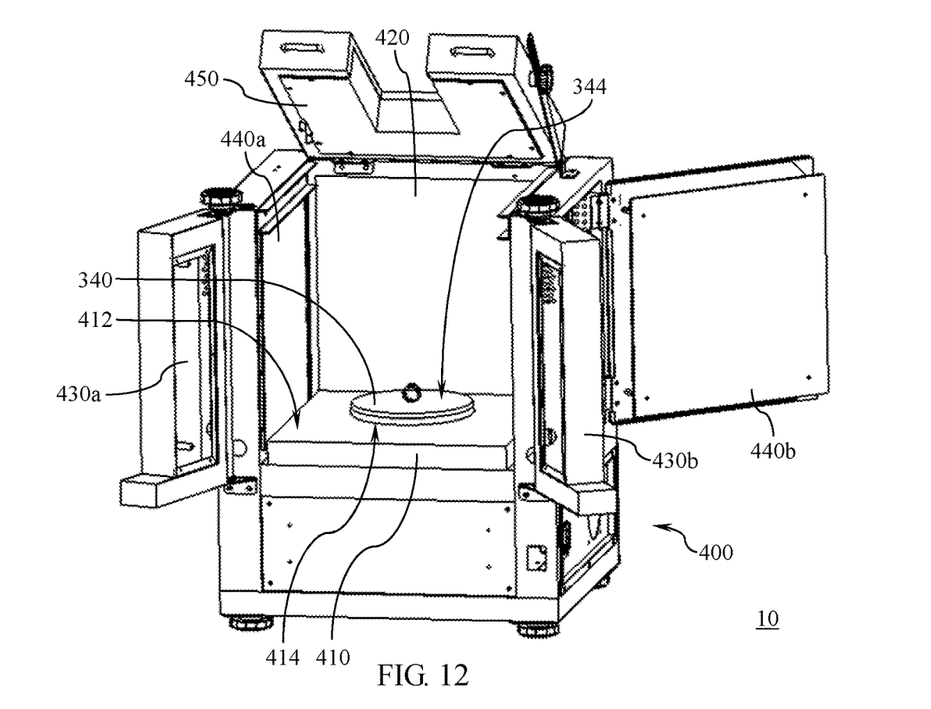
Figure 13:
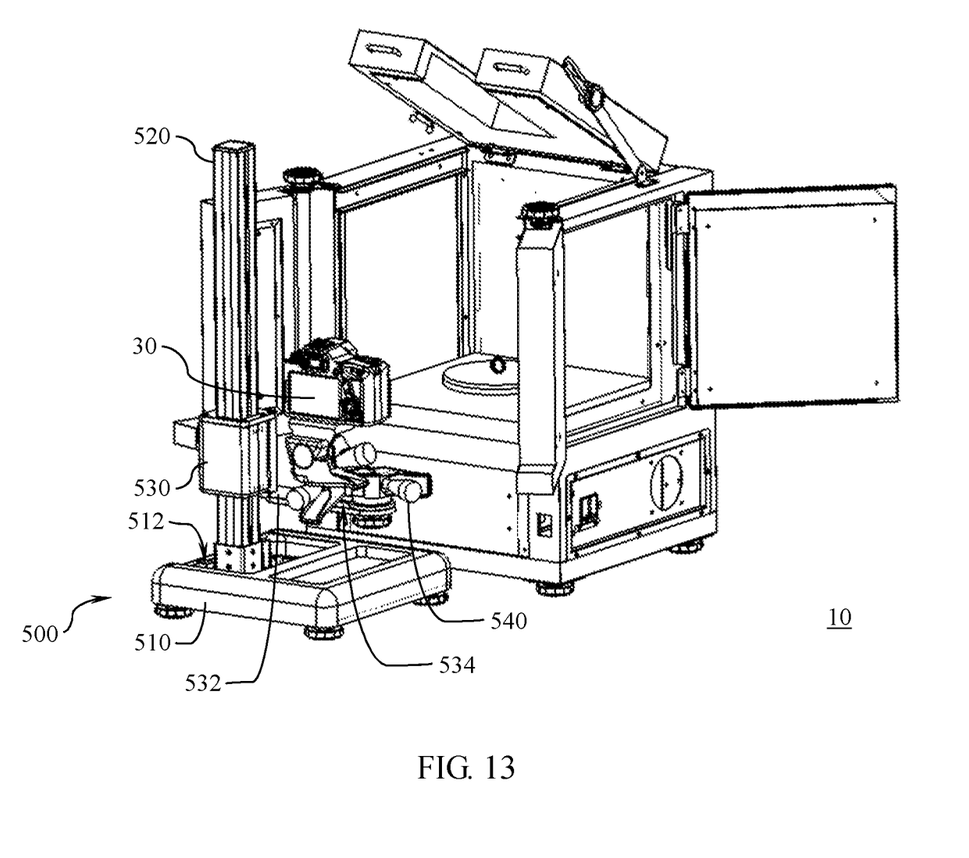

FIG. 11 to FIG. 13 respectively illustrates a structural schematic view of a light box usable for ring photography according to an embodiment of the present invention. Referring to FIG. 11 to FIG. 12 first, the present invention further illustrates a light box 10 suitable for ring photography, and the light box 10 comprises the turntable 300 described in the previous embodiment and shown in FIG. 6, a base 410 and a back light 420, wherein the detail of the turntable 300 is omitted herein. It should be noted that the turntable 300 can also be replaced by any one of the turntables 100, 200 as shown in FIG. 1 to FIG. 5 in some other non-illustrated embodiments.

In the present embodiment, the light box 10 can be an enclosed light box, and both of the base 410 and the back light 420 are disposed within a box 400. The base 410 can have a top surface 412 and an opening 414 formed on the top surface 412, while the back light 420 can be disposed at the rear side of the base 410. Moreover, the vacuum pump 310 as shown in FIG. 6 can be disposed outside the box 400, while the motor 320 as shown in FIG. 6 can be disposed under the top surface 410, and the platter 340 can be embedded in the opening 414. In addition, the carrying surface 344 of the platter 340 can be flush with or slightly higher than the top surface 412, so as to form a larger background together with the top surface 412 for photography. In such a case, it is possible to automatically cut out the image of the ring 20 from the background by well controlling the light via the software.

Noted that the borders of the carrying surface and the top surface will become invisible in the captured image and the color of the whole background will also become more consistent once the carrying surface and the top surface is kept in a specific height difference. Therefore, in some non-illustrated embodiments, the top surface can be composed of a first top surface adjacent to the back light and a second top surface away from the back light, and the carrying surface can be located between the first top surface and the second top surface, wherein the carrying surface can be slightly higher than the first top surface and slightly lower than the second top surface.

Moreover, the light box 10 in the present embodiment can further comprise two front lights 430a, 430b, two side lights 440a, 440b, a top light 450 and a bottom light (not shown). The front lights 430a, 430b can be disposed in front of the base 410 and respectively used as a left front light and a right front light. The side lights 440a, 440b can be disposed at the left and right sides of the base 410 and respectively used as a left side light and a right side light. The top light 450 can be disposed over the base 410 to light from the top of an object, and the bottom light can be disposed under the base 410 and the top surface 412 can be transparent or translucent to enable the light provided by the bottom light to transmit through the top surface 412.

It should be noted that even the previous embodiment illustrates an enclosed light box capable of providing a stable lighting environment, the light box can also be an open light box in other non-illustrated embodiments.

Referring to FIG. 13, in an embodiment of the present invention, the light box 10 can further comprises a tripod 500, and the tripod 500 can comprises a stage 510, a vertical arm 520, a slidable block 530 and a tripod head 540. The stage 510 can have a guiding rail 512 and a lower end of the vertical arm 520 can be glidingly disposed on the guiding rail 512. The slidable block 530 can be glidingly disposed on the vertical arm 520 and have a platform 532 and a guiding groove 534 formed on the platform 532. The tripod head 540 can be disposed on the platform 532 and capable of bringing a camera 30 held thereon to slide along the guiding groove 534. In the present embodiment, the tripod 500 can assist users in quickly adjusting a shooting distance of the camera 30 with the guiding rail 512, adjusting a height of the camera 30 with the guiding block 530, horizontally shifting the camera 30 along the guiding groove 534 to align with an object, and panning and tilting the camera 30 to aim the object and rotating the camera 30 between the portrait and landscape modes with the tripod head 540.

In summary, the turntable provided in the present invention can hold the ring to stably stand on and rotate along with the platter by vacuum suction. Thus, the ring can be shot from any orientation during ring photography without using the traditional ring holder, wax or clear adhesive dots to assist the ring to stand up since those traditional materials are difficult to avoid being captured in the image and/or easy to remain on the ring. Besides, the present invention discloses a multi-layer platter to facilitate its manufacturing and processing, various shapes of the suction hole and notch to increase vacuum suction for various styles of ring to stably stand up, and a motor with a hollow shaft to bring the ring to rotate along with the platter for 2D, 360 degrees or 3D photography. In addition, the present invention further discloses a light box capable of providing a clear and pure color background for ring photography, and it will also be possible to automatically cut out the image of the ring from the background by well lighting control via the software.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A turntable suitable for ring photography, comprising:
    a vacuum pump;
    a motor, having a hollow shaft;
    an air hose, connecting the vacuum pump and the hollow shaft; and
    a platter, having a carrying surface, a suction hole airtight communication with the hollow shaft and at least a notch formed on the carrying surface and extending outward from the suction hole, wherein a depth of the notch is smaller or equal to a thickness of the platter, the suction hole provides a vacuum suction to enable the ring to stand on the carrying surface when the vacuum pump is turned on, and the platter brings the ring to rotate when the motor is turned on.

2. The turntable as claimed in claim 1, further comprising an air connector, wherein at least one of the hollow shaft and the vacuum pump connects with the air hose via the air connector.

3. The turntable as claimed in claim 1, wherein a number of the notch is plural, and the notches are symmetrically, radially or asymmetrically arranged around a center of the suction hole.

4. The turntable as claimed in claim 1, wherein the platter is made of metals, opaque plastics, translucent plastics, transparent plastics or a combination thereof.

5. The turntable as claimed in claim 1, wherein the platter includes a first platter and a second platter, and the suction hole includes a first suction hole passing through the first platter and a second suction hole passing through the second platter.

6. The turntable as claimed in claim 5, wherein the first platter has an upper side and a tray formed on the upper side, and an inner contour of the tray matches up with an outer contour of the second platter.

7. The turntable as claimed in claim 6, wherein a depth of the tray is larger than a thickness of the second platter.

8. The turntable as claimed in claim 5, wherein the first platter has an upper side and a tray formed on the upper side, the second platter has a lower side and a protrusion formed on the lower side, and an inner contour of the tray matches up with an outer contour of the protrusion.

9. The turntable as claimed in claim 8, wherein a periphery of the second platter is flush with or extending outward from a periphery of the first platter.

10. The turntable as claimed in claim 5, wherein the platter further comprises a sealing unit sealing between or around the first platter and the second platter.

11. The turntable as claimed in claim 5, wherein two opposite ends of at least one of the first suction hole and the second suction hole have different at least one of sizes and shapes in cross-section.

12. The turntable as claimed in claim 1, wherein the suction hole is a round hole, an ellipse hole, an oval hole, an elongated hole, a square hole, a rectangle hole, a diamond hole, a polygon hole, a truncated cone hole, a truncated hemispherical hole or a combination thereof.

13. A light box suitable for ring photography, comprising:
the turntable as claimed in claim 1; and
a box, including a base having a top surface and an opening formed on the top surface, wherein the vacuum pump is disposed under the top surface or outside the box, the motor is disposed under the top surface, and the platter is embedded in the opening.

14. The light box as claimed in claim 13, wherein the carrying surface is flush with or slightly higher than the top surface.

15. The light box as claimed in claim 13, wherein the box further comprises at least one of a back light disposed to a rear side of the base, a front light disposed to a front side of the base, a side light disposed to a side of the base, a top light disposed over the base and a bottom light disposed under the top surface and the carrying surface, and the top surface and the carrying surface are transparent or translucent.

16. The light box as claimed in claim 15, wherein the top surface includes a first top surface adjacent to the back light and a second top surface away from the back light, the platter is located between the first top surface and the second top surface, and the carrying surface is slightly higher than the first top surface and slightly lower than the second top surface.

17. The light box as claimed in claim 13, further comprises a tripod, wherein the tripod is disposed in front of the box for holding a camera.

* * * * *